United States Patent [19]
Takai et al.

[11] Patent Number: 5,578,266
[45] Date of Patent: Nov. 26, 1996

[54] ALLOYS SUITABLE FOR HYDROGEN STORAGE, METHOD OF PRODUCING THE SAME AND ELECTRODE USING THE SAME

[75] Inventors: Yasushi Takai, Matsudo; Kazuhiro Yamada, Tokorozawa; Takashi Toide, Takefu; Shigenobu Tajima, Kiyose, all of Japan

[73] Assignee: Shin-Etsu Chemical Co., Ltd., Tokyo, Japan

[21] Appl. No.: 308,327

[22] Filed: Sep. 19, 1994

[30] Foreign Application Priority Data

Sep. 20, 1993 [JP] Japan ................................. 5-257846

[51] Int. Cl.[6] ........................................................ C22C 1/02
[52] U.S. Cl. ............................ 420/83; 420/417; 420/422; 420/424; 420/428; 420/434; 420/435; 420/469; 420/513; 420/528; 420/590; 420/900
[58] Field of Search ............................. 420/900, 83, 417, 420/422, 424, 428, 434, 435, 469, 513, 528, 590

[56] References Cited

U.S. PATENT DOCUMENTS 5,376,474  12/1994  Tadokoro et al. ................... 420/900

Primary Examiner—Melvyn Andrews
Attorney, Agent, or Firm—Millen, White, Zelano, & Branigan, P.C.

[57] ABSTRACT

Disclosed are a hydrogen storage alloy which contains carbon in a proportion of from 30 to 500 ppm and is represented by the stoichiometric formula $A_xB_{5.0}$, wherein A is La or a mixture of La with at least one rare earth metal other than La, B is at least one metal selected from a group consisting of Al, Co, Cr, Cu, Fe, Mn, Ni, Ti, V, Zn and Zr, and x is a rational number in the range $0.95 \leq x \leq 1.00$; and has a texture in which only the intermetallic compound phase named $AB_5$ phase is present and every other intermetallic compound phase is absent: and a method of producing said alloy and an electrode using the same.

2 Claims, 1 Drawing Sheet

ALLOYS SUITABLE FOR HYDROGEN STORAGE, METHOD OF PRODUCING THE SAME AND ELECTRODE USING THE SAME

FIELD OF THE INVENTION

The present invention relates to alloys suitable for storage of hydrogen, a method of producing said alloys and electrodes using these alloys.

BACKGROUND OF THE INVENTION

Since alloys capable of storing and releasing hydrogen (which are abbreviated as "hydrogen storage alloys" hereinafter) were discovered and known to be applicable to the storage of hydrogen, it has been attempted to extend their application to a heat pump and a cell without limiting their use to the means of storing hydrogen. In particular, the alkaline rechargeable batteries using such alloys as negative electrode have reached nearly practical levels, and the alloys used therein have undergone successive improvements.

More specifically, the $LaNi_5$ alloy which was first examined (Japanese Tokkai Sho 51-13934, wherein the term "Tokkai" means an "unexamined patent application") has an advantage in that it can store a large quantity of hydrogen. However, it has also disadvantages in that not only La metal is expensive but also the alloy tends to pulverize through the alternation of storage and release of hydrogen and to be corroded by an alkaline or acidic solution.

When the above-cited alloy was used as the electrode of an alkaline rechargeable battery, therefore, it had high electric capacity in the early stage of use, but the electric capacity thereof was reduced to one half or less by about 50 times' repetition of a charge-discharge cycle. That is, such a battery cannot withstand the use of long duration.

The drawbacks as described above were mitigated by partly replacing the lanthanum (La) with another rare earth element such as Ce, Pr, Nd, etc., and/or the nickel (Ni) with another metal such as Co, Al, Mn, etc. (as disclosed in Japanese Tokkai Sho 53-4918, Japanese Tokkai Sho 54-64014, Japanese Tokkai Sho 60-250558, Japanese Tokkai Sho 61-91862 and Japanese Tokkai Sho 61-233969).

Those alloys, although they were somewhat inferior to the $LaNi_5$ alloy in quantity of hydrogen stored therein, underwent improvements in liability to corrosion by alkaline and acid solutions and in charge-discharge cycle life of an alkaline rechargeable battery.

However, they were still short in charge-discharge cycle life from an industrial point of view, and so it was hard to say that they had sufficient practical utility.

The hydrogen storage alloys having the crystal structure of $CaCu_5$ type (which are hereinafter called the $AB_5$ type alloys) have a multi-phase texture composed of various intermetallic compounds, metals and so on. This is a main reason why such alloys are, as described above, liable to be corroded by alkaline and acidic solutions. Further, it is considered that microcracks formed in the corroded intermetallic compound part push the alloys to be finely pulverized. Of the intermetallic compounds which constitute the $AB_5$ type alloy, it is supposed that the greater the proportion of the metal on the side A in an intermetallic compound, the more serious the corrosion by alkaline and acidic solutions.

In order to solve the above-described problems, we have made intensive studies. As a result thereof, it has been found that the corrosion resistivity and the charge-discharge cycle life of a hydrogen storage alloy can be improved when an alloy contains only the intermetallic compound named $AB_5$ phase while every other intermetallic compound phase is absent in the alloy, thereby achieving the present invention.

SUMMARY OF THE INVENTION

Therefore, a first object of the present invention is to provide a hydrogen storage alloy which has a life span long enough for practical use due to its high corrosion resistance and reduced tendency for fine pulverization when it is used for hydrogen storage or applied to a heat pump and the like.

A second object of the present invention is to provide a method of producing a hydrogen storage alloy wherein only the intermetallic compound named $AB_5$ phase can be selectively casted.

A third object of the present invention is to provide an electrode for an alkaline rechargeable battery which uses a hydrogen storage alloy and has a long charge-discharge cycle life.

The above-described objects of the present invention are attained with a hydrogen storage alloy which contains carbon in a proportion of from 30 to 500 ppm and is represented by the stoichiometric formula $A_x B_{5.0}$, wherein A is La or a mixture of La with at least one rare earth metal other than La, B is at least one metal selected from a group consisting of Al, Co, Cr, Cu, Fe, Mn, Ni, Ti, V, Zn and Zr, and x is a rational number in the range $0.95 \leq x \leq 1.00$; and has a texture in which the $AB_5$ phase alone is present and every other intermetallic compound phase is absent.

DETAILED DESCRIPTION OF THE INVENTION

Figure 1:
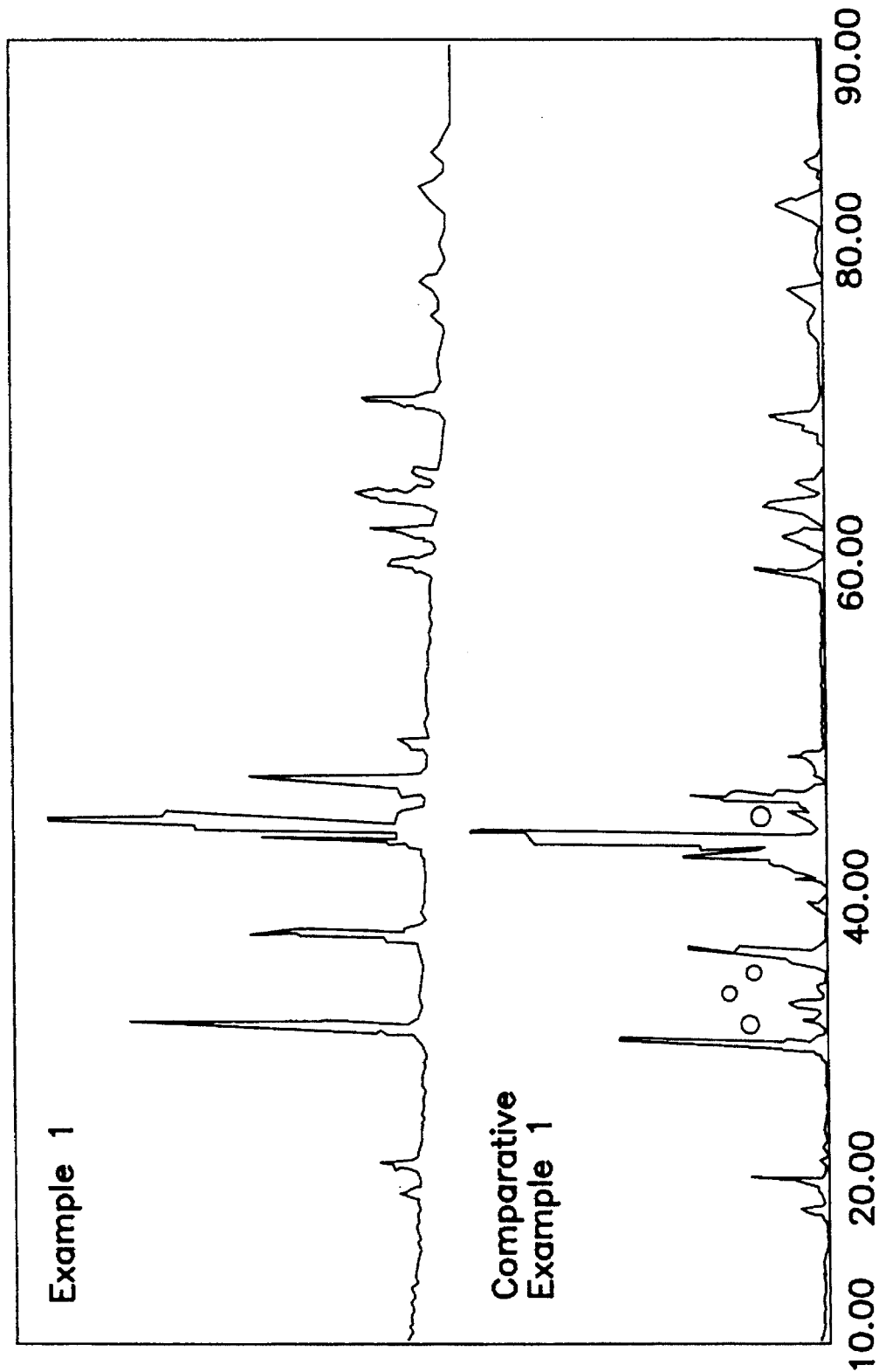
In FIG. 1, there are shown X-ray diffraction charts of the alloy textures obtained in Example 1 and Comparative Example 1 respectively.

The hydrogen storage alloys of the present invention are represented by the stoichiometric formula $A_{0.95-1.0}B_{5.0}$, and their texture has only one intermetallic compound phase named the $AB_5$ phase. More specifically, any other intermetallic compound phases, that is, those named $A_2B_7$ phase, $AB_2$ phase, $AB_3$ phase, $AB$ phase and $A_3B$ phase, and any metal phases, that is, those named A phase and B phase, are absent in the alloy texture of the present invention.

An alloy having the foregoing composition of mixed metals can be produced properly adopting a conventional method so far as some of the metallic elements described above are weighed out and mixed in respective amounts corresponding to the intended composition. In the production thereof, it is desirable in particular that the metals be fused using a high-frequency wave fusion method, an arc fusion method, a plasma jet flame fusion method, electron-beam fusion method or so on.

In mixing metals, it is required to add carbon in such an amount that the hydrogen storage alloy to be produced may have a carbon content of from 30 to 500 ppm. The addition of a slight amount of carbon can inhibit other intermetallic compounds, such as those named the $A_3B_7$ phase, the $AB_2$ phase and so on, from separating out, and enables the solidification of the $AB_5$ phase alone, thereby depositing the intermetallic compound named the AB5 phase on the grain boundary. When the carbon content is less than 30 ppm, the deposition of intermetallic compounds other than the $AB_5$ phase cannot be inhibited. When the carbon content is increased beyond 500 ppm, on the other hand, the carbon deposited on the grain boundary is increased in quantity. The thus deposited carbon becomes an obstacle to the storage-and-release of hydrogen and, what is worse, accelerates the corrosion through the reaction of the excess carbon with hydrogen.

In solidifying an alloy by cooling it after fusion, the intermetallic compounds constituting the alloy generally solidify in the order of decreasing melting point. In the production of a hydrogen storage alloy according to the present invention, the alloy is solidified in the order, the AB5 phase, the $A_2B_7$ phase, the $AB_2$ phase, the $AB_3$ phase, the AB phase-and the $A_3B$ phase. As for the alloy texture, therefore, grains are first formed in the $AB_5$ phase, and on this grain boundary comes to be present another intermetallic compound, mainly the intermetallic compound named the $A_2B_7$-phase. Hereupon, the addition of a slight amount of carbon causes the deposition of carbon on the grain boundary at the time of solidification of the $AB_5$ phase, and so it can inhibit the deposition of other intermetallic compounds named the $A_2B_7$ phase, the $AB_2$ phase and so on respectively.

Thus, the alloy cooled down is ground to give the hydrogen storage alloy powder constituted of only the intermetallic compound named the $AB_5$ phase.

More specifically, a homogeneously fused mixture of the prescribed metals to which carbon is added in advance in an amount of from 30 to 500 ppm is cooled down at a cooling speed of from 4 to less than 100° C./sec, thereby obtaining grains of the $AB_5$-phase. Cooling the fused mixture can be effected, e.g., by casting it in a mold cooled with water.

As for the quick cooling method of fused metals, there are known the methods disclosed in Japanese Tokkai Sho 58-217609, Japanese Tokkai Sho 63-291363 and Japanese Tokkai Hei 3-216959. These methods utilize a rotating disc system, a rotaing roll system and a gas atomizing system respectively, and have an advantage in that they make it unnecessary to grind the alloys produced thereby. Even if these methods are adopted in the present invention, however, they cannot provide the present hydrogen storage alloy which is represented by the stoichiometric formula $A_{0.95-1.0}B_{5.0}$ and has the $AB_5$ phase alone. In case the alloys obtained using such methods are used as electrodes, the resulting batterys are low in retention rate of battery capacity.

As a reason for the low capacity-retaining rate of such batterys, it can be thought that the alloys produced by those methods are amorphous powders because of high cooling speeds adopted therein which are over 100° C./sec, that is, higher than the suitable range for the present invention.

In the alloy texture obtained by the present method, on the other hand, the intermetallic compound forms into remarkably fine grains. In other words, the gap between every pair of grains is narrowed due to fineness of the grains formed, and thereby can be lessened the grain boundary. Thus, it becomes possible to inhibit the deposition of other intermetallic compounds.

Moreover, a negative electrode for an alkaline rechargeable battery can be easily prepared using the present hydrogen storage alloys in a conventional manner. For instance, the powder of an alloy according to the present invention is mixed with a small amount of binder, loaded in or on a conductive support, and then formed into an electrode.

The hydrogen storage alloys according to the present invention, as described hereinabove, can fully achieve their effects when they are used as negative electrode of an alkaline rechargeable battery.

In addition, it is a matter of course that they can be used for their original purpose, that is, as a means of storing hydrogen, or for a heat pump and the like.

In accordance with the present invention, there are produced the hydrogen storage alloys having greatly improved corrosion resistance to alkaline and acidic solutions since they have the stoichiometric formula of $A_{0.95-1.0}B_{5.0}$ and their alloy texture has the $AB_5$ phase alone. Therefore, it can be emphatically said that when the present alloys are applied to the negative electrode of an alkaline rechargeable battery, higher performance than ever and a sufficiently long charge-discharge cycle life can be conferred on the battery.

Now, the present invention will be illustrated in more detail by reference to the following examples. However, the invention should not be construed as being limited to these examples.

EXAMPLES 1 TO 8

Metallic elements, La (purity: above 99%), Ce (purity: above 99%), Pr (purity: above 99%), Nd (purity: above 99 %), Ni (purity: above 99%), Co (purity: above 99%), Al (purity: above 99%) and M (Mn, Fe, Cu), were weighed out and mixed in their respective amounts such that the resulting mixture might have a composition as set forth in Table 1. Thereto, carbon was added in an amount ranging from 50 to 400 ppm. Then, the carbon-added mixture was fused using a high-frequency wave fusion method, and cast in a mold cooled with water. Thus, the hydrogen storage alloy having the composition as shown in Table 1 was produced.

TABLE 1

| | Stoickiometric Formula of Alloy | Composition of Ln (wt %) | | | | C (ppm) | Cooling Speed (°C./sec) |
| --- | --- | --- | --- | --- | --- | --- | --- |
| | | La | Ce | Pr | Nd | | |
| Example 1 | $Ln_{1.0}Ni_{3.75}Co_{0.75}Al_{0.3}Mn_{0.2}$ | 60 | 5 | 30 | 5 | 400 | 10 |
| Example 2 | $Ln_{0.99}Ni_{3.75}Co_{0.75}Al_{0.3}Mn_{0.2}$ | 60 | 30 | 5 | 5 | 50 | 10 |
| Example 3 | $Ln_{0.99}Ni_{3.75}Co_{0.75}Al_{0.3}Mn_{0.2}$ | 60 | 5 | 5 | 30 | 50 | 8 |
| Example 4 | $Ln_{0.99}Ni_{4.0}Co_{0.7}Al_{0.3}$ | 60 | 30 | 5 | 5 | 50 | 4 |
| Example 5 | $Ln_{0.99}Ni_{3.75}Co_{0.75}Al_{0.3}Fe_{0.2}$ | 60 | 30 | 5 | 5 | 50 | 20 |
| Example 6 | $Ln_{0.99}Ni_{3.75}Co_{0.75}Al_{0.3}Cu_{0.2}$ | 60 | 5 | 5 | 30 | 50 | 50 |
| Example 7 | $Ln_{0.97}Ni_{3.65}Co_{0.75}Al_{0.3}Mn_{0.2}Fe_{0.2}$ | 60 | 30 | 5 | 5 | 50 | 80 |
| Example 8 | $Ln_{0.96}Ni_{3.75}Co_{0.75}Al_{0.3}Mn_{0.2}Cu_{0.1}$ | 60 | 30 | 5 | 5 | 50 | 95 |
| Comparative Example 1 | $Ln_{1.10}Ni_{3.75}Co_{0.75}Al_{0.3}Mn_{0.2}$ | 60 | 5 | 30 | 5 | 300 | 10 |
| Comparative Example 2 | $Ln_{0.93}Ni_{3.75}Co_{0.75}Al_{0.3}Mn_{0.2}$ | 60 | 5 | 30 | 5 | 300 | 10 |

TABLE 1-continued

| | Stoichiometric Formula of Alloy | Composition of Ln (wt %) | | | | C (ppm) | Cooling Speed (°C./sec) |
|---|---|---|---|---|---|---|---|
| | | La | Ce | Pr | Nd | | |
| Comparative Example 3 | $Ln_{0.99}Ni_{3.75}Co_{0.75}Al_{0.3}Mn_{0.2}$ | 60 | 5 | 30 | 5 | 3000 | 10 |
| Comparative Example 4 | $Ln_{0.99}Ni_{3.75}Co_{0.75}Al_{0.3}Mn_{0.2}$ | 60 | 5 | 30 | 5 | 300 | 3 |
| Comparative Example 5 | $Ln_{0.99}Ni_{3.75}Co_{0.75}Al_{0.3}Mn_{0.2}$ | 60 | 5 | 30 | 5 | 300 | 110 |
| Comparative Example 6 | $Ln_{1.00}Ni_{5.00}$ | 100 | 0 | 0 | 0 | 1000 | 10 |
| Comparative Example 7 | $Ln_{1.00}Ni_{5.00}$ | 100 | 0 | 0 | 0 | 0 | 10 |

In casting the fused mixture in the water-cooled mold, the cooling speed of the fused mixture was controlled by properly choosing the cast thickness from the range of 5 to 20 mm.

The thus obtained alloys were each ground into fine grains having a size smaller than 75 μm to give a powder. A 10 g portion of this powder was admixed with 2.5 g of a 3 wt % aqueous solution of polyvinyl alcohol to make paste. The paste obtained was filled into a porous foam of Ni metal, dried and then formed with a press to make an electrode having a thickness of 0.5 to 1.0 mm. Further, the electrode was fitted with a lead wire to form in a negative electrode.

As for the positive electrode, on the other hand, a porous sintered nickel was impregnated with $Ni(OH)_2$, and then subjected to a formation treatment to make a NiOOH electrode.

In producing an alkaline rechargeable battery, the thus made negative and positive electrodes were pasted together through a separator made of nonwoven polyolefin fabric, and 6 mole/l of KOH was used as electrolytic solution.

The thus produced rechargeable battery was charged with electricity for 2 hours by sending thereto an electric current of 40 mA, and then made to discharge an electric current of 20 mA untill the battery voltage was dropped to 0.6 V. By repetition of this charge-discharge operation, the rechargeable battery was examined for charge-discharge cycle life at 20° C.

COMPARATIVE EXAMPLES 1 TO 7

Other hydrogen storage alloys having compositions as shown in Table 1 were produced in the same manner as in Examples described above, except that:

in Comparative Examples 1 and 2 each, the metals were mixed in such amounts that the resulting mixture might have a composition beyond the scope of the present invention, namely the value x which is out of the range $0.95 \leq x \leq 1.00$ in the stoichiometric formula $A_xB_{5.0}$;

in Comparative Examples 3, 6 and 7, the amounts of the carbon added was changed to 3,000 ppm, 1,000 ppm and 0 ppm, respectively;

in Comparative Example 4, the mold used for casting was not cooled with water and the cooling speed was controlled to 3° C./sec by choosing the cast thickness of 20 mm; and in Comparative Example 5, the fused mixture was quickly cooled using a rotating roll system, and so the cooling speed was 110° C./sec.

Alkaline rechargeable batteries were produced in the same way as in Examples described above, except that the alloys produced in Comparative Examples 1 to 7 were used for making negative electrodes, respectively; and then they each were charged and discharged alternately under the same conditions as in the foregoing Examples in order to examine for charge-discharge cycle life. The results obtained are shown in Table 2.

TABLE 2

| | Initial Battery Capacity $C_0$ (mAh/g) | Battery Capacity After 300 cycles $C_{300}$ (MAh/g) | Retention Rate of Capacity $C_{300}/C_0$ (%) |
|---|---|---|---|
| Example 1 | 286 | 255 | 89 |
| Example 2 | 285 | 257 | 90 |
| Example 3 | 282 | 262 | 93 |
| Example 4 | 278 | 250 | 90 |
| Example 5 | 278 | 236 | 85 |
| Example 6 | 273 | 235 | 86 |
| Example 7 | 271 | 233 | 88 |
| Example 8 | 272 | 237 | 87 |
| Comparative Example 1 | 284 | 122 | 43 |
| Comparative Example 2 | 283 | 133 | 40 |
| Comparative Example 3 | 285 | 137 | 48 |
| Comparative Example 4 | 283 | 139 | 49 |
| Comparative Example 5 | 230 | 179 | 78 |
| Comparative Example 6 | 318 | 97 | 31 |
| Comparative Example 7 | 332 | 114 | 34 |

As can be seen from Table 2, all the rechargeable batteries produced in Examples 1 to 8 were markedly high in retention rate of battery capacity, compared with those produced in Comparative Examples to 7.

These experimental results demonstrate that the corrosion resistance of an alkaline rechargeable battery can be improved by the use of the negative electrode produced in accordance with the present invention.

Then, the X-ray diffraction charts of the alloy textures obtained in Example 1 and Comparative Example 1 respectively are shown in FIG. 1.

While the chart of the alloy produced in Comparative Example 1, as noticed by FIG. 1, has the peaks ascribable to the intermetallic compound named the $A_2B_7$ phase (which are marked with ○), all the peaks present in the chart of the alloy produced in Example 1 are attributable to the intermetallic compound named the $AB_5$ phase. This fact proves that the texture of the present hydrogen storage alloy has the $AB_5$ phase alone, thereby effecting the improvement in corrosion resistance. Similarly to the above, it has been ascertained that each of the alloy textures obtained in Examples 2 to 8 had the $AB_5$ phase alone, while each obtained in Comparative Examples 2 to 7 had the $A_2B_7$ phase in addition to the $AB_5$ phase.

Additionally, the hydrogen storage alloy produced in Comparative Example 5 was an amorphous powder since it had undergone the quick cooling with the rotating roll system. Although the resulting battery was rather high in retention rate of capacity, the amorphous state of the alloy is supposed to be responsible for the drop in initial battery capacity.

What is claimed is:

1. A method of producing a hydrogen storage alloy: which comprises weighing out and mixing metallic elements A and B in such amounts that the resulting mixture can have a composition $A_xB_{5.0}$, adding carbon to the metal mixture in an amount ranging from 30 to 500 ppm, fusing the admixture homogeneously, and then cooling the homogeneously fused metallic mixture at a speed of from 4° C./sec to less than 100° C./sec to deposit only the intermetallic compound consisting of $AB_5$ phase and represented by the stoichiometric formula $A_xB_{5.0}$; wherein A is La or a mixture of La with at least one rare earth metal other than La, B is at least one metal selected from a group consisting of Al, Co, Cu, Cr, Fe, Mn, Ni, Ti, V, Zn and Zr, and x is a rational number in the range $0.95 \leq x \leq 1.00$.

2. A method of producing a hydrogen storage alloy according to claim 1, wherein B is at least one metal selected from a group consisting of Al, Co, Cu, Fe, Mn and Ni.

* * * * *